United States Patent [19]

Terada et al.

[11] Patent Number: 4,645,159
[45] Date of Patent: Feb. 24, 1987

[54] POWERED SEAT ADJUSTING DEVICE

[75] Inventors: Takami Terada, Toyota; Masayuki Hayashi, Toyohashi, both of Japan

[73] Assignee: Aisin Seiki Kabushiki Kaisha, Kariya, Japan

[21] Appl. No.: 692,041

[22] Filed: Jan. 16, 1985

[30] Foreign Application Priority Data

Feb. 7, 1984 [JP] Japan .................................. 59-21464

[51] Int. Cl.⁴ .............................................. A47C 1/023
[52] U.S. Cl. ....................................... 248/429; 297/346
[58] Field of Search ............... 248/429, 393, 394, 430; 74/425, 89.14, 89.15; 297/330, 346

[56] References Cited

U.S. PATENT DOCUMENTS

| | | | |
|---|---|---|---|
| 2,864,431 | 12/1958 | Eaton | 248/393 |
| 3,365,163 | 1/1968 | Pickles | 248/394 X |
| 3,617,021 | 11/1971 | Littmann | 248/393 |
| 3,951,004 | 4/1976 | Heesch | 248/394 X |
| 4,278,290 | 7/1981 | Werner et al. | 297/330 X |
| 4,299,316 | 11/1981 | Reinmoeller | 297/330 X |
| 4,333,627 | 6/1982 | Dembinski et al. | 248/393 X |
| 4,366,983 | 1/1983 | Klueting et al. | 297/330 X |
| 4,432,583 | 2/1984 | Russo et al. | 248/394 X |

FOREIGN PATENT DOCUMENTS 58-97528  6/1983  Japan .................................. 297/330

Primary Examiner—Ramon S. Britts
Assistant Examiner—Karen J. Chotkowski
Attorney, Agent, or Firm—Finnegan, Henderson, Farabow, Garrett & Dunner

[57] ABSTRACT

For adjusting a seat supported by a pair of mutually slidable guide rails forwardly and rearwardly, a nut member and a screw-threaded shaft engageable with each other are secured to the guide rails, one being rotatably and the other being fixedly. A driving means is coupled to the rotatable one of the nut member and the screw-threaded shaft such that the member thus coupled is slidable along the rotating axis while permitting the transmission of torque from the driving means to the coupled member.

12 Claims, 9 Drawing Figures

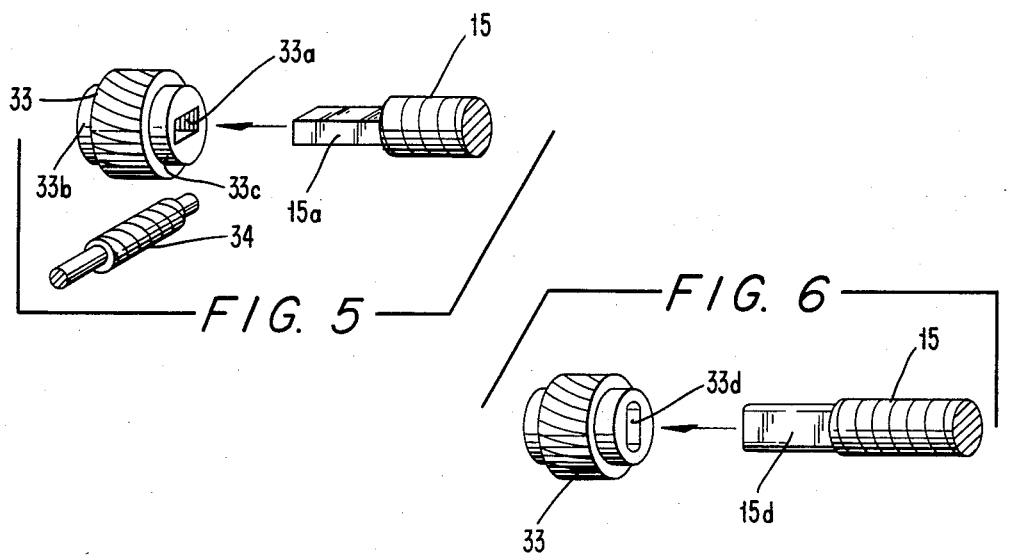
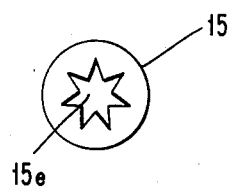
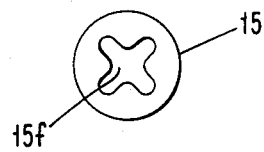
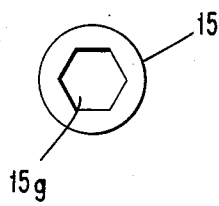
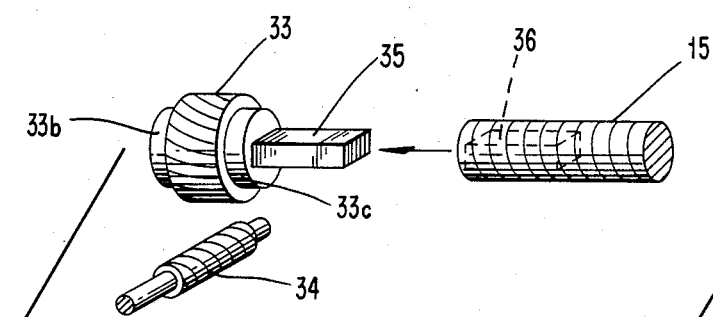

POWERED SEAT ADJUSTING DEVICE

BACKGROUND OF THE INVENTION

1. Field of the Invention

This invention relates to a powered seat adjusting device to be used for adjusting seats in automobiles and the like, and more particularly to a type thereof, wherein the position of the vehicle seat can be adjusted forwardly or rearwardly by use of an electric motor or the like.

2. Description of the Related Art

FIG. 1 illustrates a conventional powered seat adjusting device comprising an upper rail 11 secured to a seat (not shown), a lower rail 12 secured to the floor (not shown) of a vehicle, a nut 13 secured to the upper rail 11, a screw-threaded shaft 15 engaging with the nut 13, a housing 14 provided on the lower rail 12 for rotatably supporting the screw-threaded shaft 15 through bearings 17, a worm wheel 16 formed integral with the screw-threaded shaft 15, and a worm gear (not shown) meshing with the worm wheel 16. When the worm gear is rotated by an electric motor (not shown) or the like, the screw-threaded shaft 15 is rotated through the worm wheel 16, thereby shifting the nut 13 secured to the upper rail 11 and hence to the seat forwardly and rearwardly in accordance with the rotating direction of the electric motor or the like. When the operation of the motor terminates, the seat is maintained at a position determined by the engagement of the worm wheel 16 and the worm gear (not shown).

In the above described conventional device, since the screw-threaded shaft 15 is formed integral with the worm wheel 16, any load applied in the forward and rearward direction to the seat is transmitted through the upper rail 11 and the nut 13 to the screw-threaded shaft 15, thus displacing the same forwardly or rearwardly. The displacement of the shaft 15 inevitably misaligns the engagement between the worm wheel 16 and the worm gear entailing the creation of frictions and noises, and in a worst case damaging the worm wheel 16 and/or the worm gear. For preventing such difficulties, the strength of the housing 14 must be increased so as to eliminate the displacement of the screw-threaded shaft 15, which gives rise to a disadvantage of increasing the size of the housing 14.

SUMMARY OF THE INVENTION

A principal object of the present invention is to provide a powered seat adjusting device wherein the worm wheel is made so as to not be affected by from the forward and rearward movements of the screw-threaded shaft.

According to the present invention, there is provided a powered seat adjusting device wherein a seat is supported by means of a pair of guide rails which are slidable between each other so that the position of the seat relative to a floor can be adjusted forwardly and rearwardly, the device comprising a nut member provided on either one of the guide rails, a screw-threaded shaft engageable with the nut member provided on the other of the guide rails, either one of the nut member and the screw-threaded shaft being secured to the corresponding guide rail rotatably, while the other of the nut member and the screw-threaded shaft being fixed to the other guide rail, and driving means coupled to either one of the nut member and the screw-threaded shaft in a manner such that the nut member or the screw-threaded shaft thus coupled is made shiftable along the axis of rotation while permitting transmission of torque from the driving means to the coupled member.

Because of the above described construction of the seat adjusting device, even in a case where, for instance, the screw-threaded shaft is displaced along its axis forwardly or rearwardly by a load applied to the seat, the displacement of the shaft does not cause any misalignment between a worm gear and a worm wheel provided in the driving means. Since the torque of the driving means is transmitted to the driven member regardless of the axially slidable coupling, the adjustment of the seat can be performed in a manner similar to that described for the conventional device. Furthermore since forward and rearward movements of the screw-threaded shaft or the nut member are permitted, high strength construction of the brackets and bearings rotatably supporting the screw-threaded shaft or the nut member is not required, and therefore the size and the cost of the seat adjusting device can be substantially reduced.

Additional advantages of the present invention will be set forth in part in the description that follows and in part will be obvious from the description or may be learned by practice of the invention. The advantages of the invention may be realized and obtained by the methods and apparatus particularly pointed out in the appended claims.

The accompanying drawings, which are incorporated in and constitute a part of this specification, illustrate presently preferred embodiments of the invention and, together with the description, serve to explain the principles of the invention.

BRIEF DESCRIPTION OF THE DRAWINGS

In the accompanying drawings:

FIG. 5 is an exploded perspective view showing a coupling condition between a screw-threaded shaft and a worm wheel;

FIG. 6 is an exploded perspective view showing another embodiment of the invention; and FIGS. 7, 8 and 9 are front views showing further embodiments of the present invention.

FIG. 10 is an exploded perspective view showing a coupling condition between a screw-threaded shaft and a worm wheel.

DESCRIPTION OF THE PREFERRED EMBODIMENTS

Figure 1:
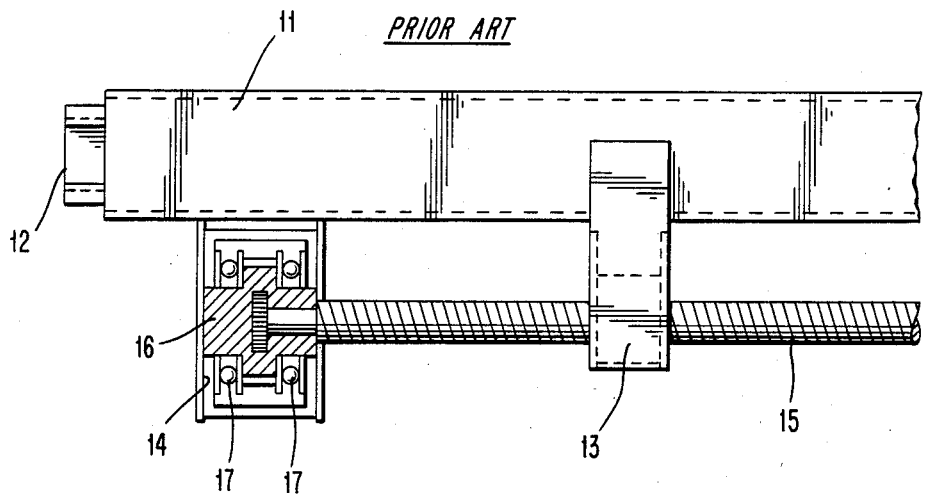
FIG. 1 is an elevational view showing one part of a conventional seat adjusting device.

The invention will now be described in detail with reference to FIGS. 2–9. Throughout the drawings, like reference characters are used to designate like elements.

Figure 2:
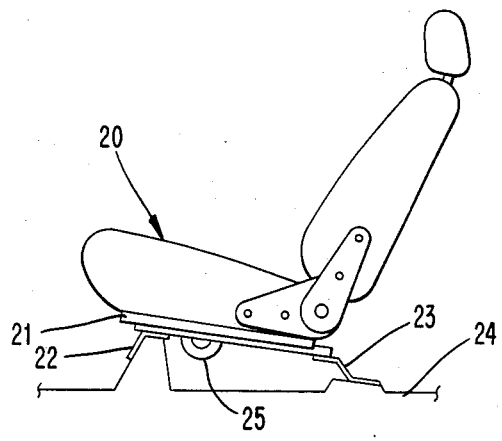
FIG. 2 is an elevational view showing a powered seat to which the present invention is applied.
Figure 3:
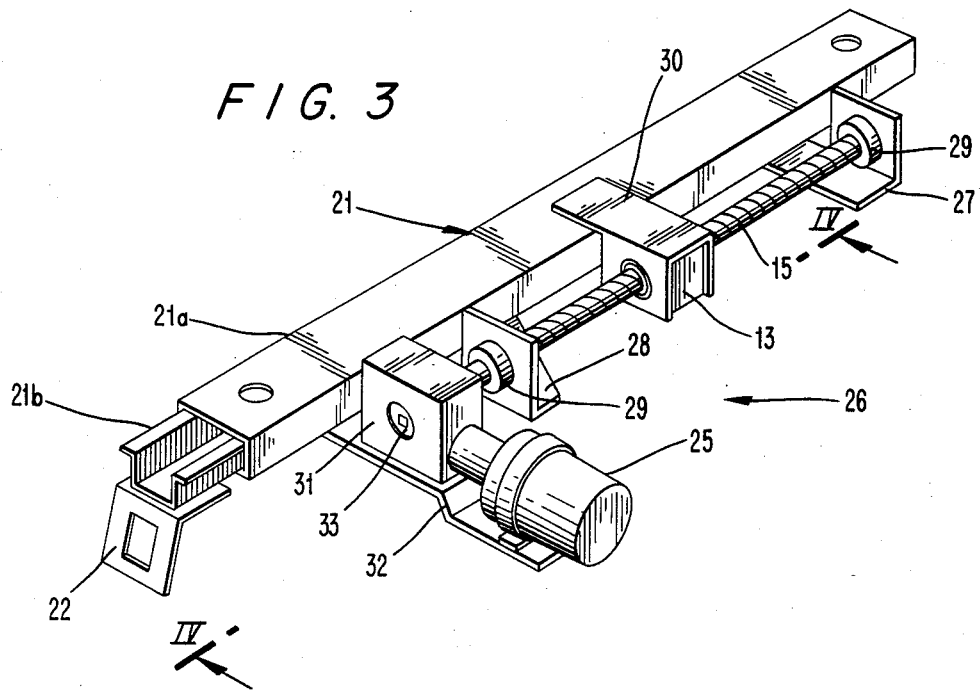
FIG. 3 is a perspective view showing a seat adjusting device according to the present invention.

Referring first to FIG. 2, there is illustrated a power adjustable seat 20 which is secured to the floor of, for instance, an automobile through guide rails 21 and brackets 22 and 23. The guide rails 21 are arranged on the right and left sides of the seat 20, either one of which is provided with a seat adjusting device 26 of the present invention. As shown in FIG. 3, the seat adjusting device 26 comprises a nut 13 secured to a bracket 30 which in turn is secured to an upper rail 21a of the guide rail 21, a screw-threaded shaft 15 engageable with the nut 13, brackets 27 and 28 provided at both ends of the screw-threaded shaft 15 to be secured to a lower rail 21b of the guide rail 21 for supporting the screw-threaded shaft 15 rotatably through bearings 29, another bracket 32 secured to the lower rail 21b for supporting a motor 25, and a housing 31 fixedly mounted on the bracket 32 for rotatably supporting a worm wheel 33. As best illustrated in FIG. 5, the worm wheel 33 engages a worm gear 34 driven by the motor 25. Reference numeral 35 designates a nut securing the bearings 29 to the screw-threaded shaft 15. Other members similar to those indicated in FIG. 1 are designated by similar reference numerals as in FIG. 1. In the above described construction, the upper rail 21a and the lower rail 21b may be interchanged with each other.

Figure 4:
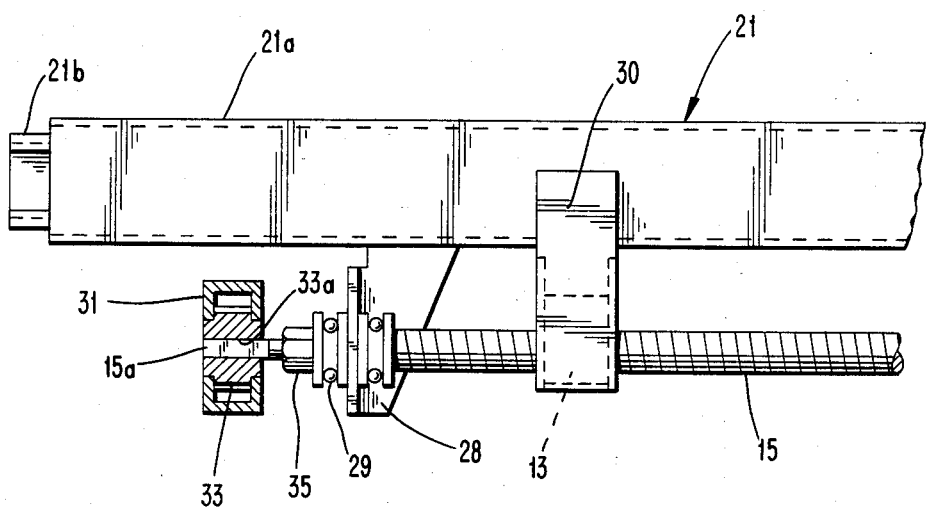
FIG. 4 is a partial sectional view taken along the line IV—IV in FIG. 3.

According to the essential feature of the present invention, the worm wheel 35 is coupled to the screw-threaded shaft 15 as shown in FIG. 5. More specifically, at an end opposing the worm wheel 33, the screw-threaded shaft 15 is provided with an end portion 15a having a rectangular cross-section. A rectangular recess 33a, engageable with the end portion 15a, is formed axially in the worm wheel 33. When the worm wheel 33 is encased in the housing 31 as shown in FIG. 4 with the annular flange portions 33b and 33c held rotatably, the rectangular formed end portion 15a of the screw-threaded shaft 15 is inserted into the recess 33a of the worm wheel 33 in a loose fit manner. Because the worm wheel 33 and the screw-threaded shaft 15 are coupled together as described above through a portion asymmetric with respect to the rotating axis, lengthwise movements of the screw-threaded shaft 15 are permitted, and the rotation of the worm wheel 33 is transmitted to the screw-threaded shaft 15 regardless of the axial displacement of the screw-threaded shaft 15. Furthermore, the worm wheel 33 is maintained at its position regardless of the axial displacement of the shaft 15. Because any load applied to the seat 20 through the upper rail 21a and the nut 13 to the screw-threaded shaft 15 is further transmitted through the brackets 27, 28 and the lower rail 21b to the floor, and no part of the load is applied to the housing 31, the weight, size and the construction cost of the housing 31 can be substantially reduced. Because the rectangular end portion 15a of the screw-threaded shaft 15 is inserted into the rectangular recess 33a of the worm wheel 33 in a loose fit manner, the rotation of the worm wheel 33 is transmitted to the screw-threaded shaft 15 even where the rotating axis of the screw-threaded shaft 15 deviates slightly from the rotating axis of the worm wheel 33. Thus the necessity of centering the worm gear 34, worm wheel 33 and the screw-threaded 15 is eliminated. To assure smooth engagement of the worm gear 34 and the worm wheel 33, accurate positionings of only the two members is required.

Although the rectangular end portion 15a and the rectangular recess 33a have been provided for the screw-threaded shaft 15 and the worm wheel 33, respectively, it is apparent that a rectangular recess 36 may be provided at an end of the screw-threaded shaft 15, while a rectangular projection 35 may be formed on the worm wheel 33 as shown in FIG. 10. According to another embodiment of the invention, the rectangular portion 15a of the screw-threaded shaft 15 may be provided in an intermediate portion between the brackets 27 and 28 together with the mating recess.

Although in the above described arrangement, the screw-threaded shaft 15 has been supported rotatably while the nut 13 is supported stationarily, it is apparent that the screw-threaded shaft 15 may be held stationary while the nut 13 is supported rotatably to be driven by the motor 25. In such case, the coupling projection and recess will be provided between the nut 13 and the worm wheel for driving the nut 13.

The coupling constituting the essential feature of the present invention may otherwise be obtained by use of end portion 15d of two-face configuration and the mating recess 33d as shown in FIG. 6. Otherwise, the configuration of the end portion may be a star-shape 15e as shown in FIG. 7, a cross-shape 15f as shown in FIG. 8, or a hexagonal shape 15g as shown in FIG. 9. Although only the configuration of the end portion of the screw-threaded shaft 15 has been indicated in FIGS. 7, 8 and 9, the recess of the worm wheel 33 is also formed into the star-shape, cross-shape and the hexagonal configuration in accordance with that of the end portion while maintaining the loose fit condition between the worm wheel 33 and the screw-threaded shaft 15.

It will be apparent to those skilled in the art that modifications and variations can be made in the powered seat adjusting device of this invention. The invention in its broader aspects is, therefore, not limited to the specific details, representative methods and apparatus, and illustrative examples shown and described herein above. Thus, it is intended that all matter contained in the foregoing description or shown in the accompanying drawings shall be interpreted as illustrative and not in a limiting sense.

We claim:

1. A powered seat adjusting device wherein a seat is slidably supported by a pair of rails so that the position of the seat relative to a floor can be adjusted forwardly and rearwardly, the device comprising:

a nut member connected to one of the rails;

a screw-threaded shaft connected to the other of the rails, said screw-threaded shaft engaged with said nut member and mounted for rotation relative to said nut member;

a worm wheel coupled to said screw-threaded shaft, said worm wheel being slidably mounted on said screw-threaded shaft so as to be slidably shiftable relative to the axis of rotation of said screw-threaded shaft, and the coupling between the worm wheel and the shaft having cooperating means preventing relative rotation between said wheel and said shaft, said cooperating means permitting translation of torque from said worm wheel to said shaft; and a worm gear meshing with said worm wheel and a driving motor, said worm gear connected to be rotatably driven by said driving motor.

2. A powered seat adjusting device as set forth in claim 1 further comprising brackets fixed to the other of said rails, wherein said screw-threaded shaft is rotatably secured to the other of said rails through said brackets, said brackets preventing axial shifting of said shaft with respect to the other of said rails.

3. A powered seat adjusting device as set forth in claim 1 further comprising a recess formed in said worm wheel and a projection formed on said screw-threaded shaft, said projection having a configuration which engages said recess in a loose fit manner.

4. A powered seat adjusting device as set forth in claim 3 wherein said recess and projection are in cross-section formed in substantially a rectangular shape.

5. A powered seat adjusting device as set forth in claim 3 wherein said recess and projection are in cross-section formed in substantially a two-face configuration.

6. A powered seat adjusting device as set forth in claim 3 wherein said recess and projection are in cross-section formed in substantially a cross shape.

7. A powered seat adjusting device as set forth in claim 3 wherein said recess and projection are in cross-section formed in substantially a star shape.

8. A powered seat adjusting device as set forth in claim 2 further comprising a recess formed in said screw-threaded shaft and a projection formed on said worm wheel, said projection having a configuration which engages said recess in a loose fit manner.

9. A powered seat adjusting device as set forth in claim 8 wherein said recess and projection are in cross-section formed in substantially a rectangular shape.

10. A powered seat adjusting device as set forth in claim 8 wherein said recess and projection are in cross-section formed in substantially a two-face configuration.

11. A powered seat adjusting device as set forth in claim 8 wherein said recess and projection are in cross-section formed in substantially a cross shape.

12. A powered seat adjusting device as set forth in claim 8 wherein said recess and projection are in cross-section formed in substantially a star shape.

* * * * *